Patented Sept. 28, 1926.

1,601,457

UNITED STATES PATENT OFFICE.

EDWARD C. SMITH, OF FREMONT, OHIO, ASSIGNOR TO NATIONAL CARBON COMPANY, INC., A CORPORATION OF NEW YORK.

DRY CELL AND DEPOLARIZING COMPOSITION THEREFOR.

No Drawing. Application filed December 30, 1922. Serial No. 610,043.

This invention relates to improvements in dry cells. A principal object of the invention is to impart certain desirable characteristics to dry cells, especially those of the Le Clanché type, by the use of regulated quantities of non-conductive, non-oxidizing, absorptive materials.

I have discovered that an increased service life and other advantages result from the presence of such materials in the cells. The quantity of electrolyte liquid that the cells can retain is increased, and the advantageous characteristics are probably due mainly to this fact.

The electrolyte paste or bibulous lining and manganese dioxid-carbon depolarizing composition ordinarily used are in general unable to take up and retain sufficient electrolyte solution to cooperate most efficiently with the quantities of zinc and depolarizer present. By supplying inert materials of high absorptive capacity, according to the present invention, more electrolyte can be incorporated in the cell and greater service life obtained.

In the preferred form of the invention, diatomaceous earth is incorporated with manganese dioxid and carbon to form a conducting and depolarizing composition. The weight of the diatomaceous earth used should not ordinarily exceed that of the carbon. The maximum improvement appears to be attained by the addition of inert material in amount of about 30% of the weight of the carbon. Excellent results have been obtained by using the following mixture:

| | Parts by weight. |
|---|---|
| Manganese dioxid | 150 |
| Carbon | 100 |
| Diatomaceous earth | 30 |

These proportions may of course be considerably varied in accordance with the particular result desired.

When using the mixture specified, an increase of about 30% in service life over comparable cells containing no inert material is obtained. The improved cells contain approximately 13% more liquid than the old type.

The presence of the inert material somewhat increases the internal resistance of the cell, but the resulting reduction of amperage is not in general objectionable. It is in fact a positive advantage in some cases, as for example in cells for telephone or radio service, where the short-circuit current of cells with standard depolarizer is often undesirably high.

Instead of diatomaceous earth, other inert absorptive materials may be used. For example, finely ground pumice is suitable. Certain materials not in themselves highly absorptive may also be used because their presence tends to increase the moisture-retaining capacity of the depolarizer as a whole. Such materials are slate, talc, or asbestos, each in comminuted condition, fine sand, or the like. Suitable mixtures of inert materials may be used if desired. Since the inert materials mentioned are in general considerably cheaper than the carbon and manganese dioxid which they replace, a further advantage of the invention is the reduction in cost effected by their use.

With regard to the use of asbestos, I am aware that this substance, in fibrous form, as a means for bonding dry cell depolarizer and increasing its permeability, is disclosed and claimed in an application, Serial No. 488,180, filed by Carl Hambuechen on July 28, 1921, and I make no claim to such invention.

While it is preferred to mix the inert material with the depolarizer, it will be understood that such material may be disposed in one or more layers, or otherwise supplied in any suitable manner. Bobbins or the like may be formed from the improved depolarizing composition, or it may be tamped into the cells.

I am aware that diatomaceous earth and other inert materials have been used as absorbents for electrolyte in dry cells of primitive design, but no attempt appears to have been made to dispose the absorbent in the best relation to the depolarizer, as by embodying it in the depolarizing composition, nor to adjust the amount of the absorbent so that the maximum electrolyte content may be obtained without undue increase of internal resistance. My invention, as distinguished from the prior art, resides in the regulated addition of inert materials to obtain maximum service life and other advantages, especially in cells of the present commercial type with a gelatinous electrolyte-retaining substance forming a continuous layer or held at least in part within the pores of a bibulous lining.

Various modifications of the specific procedure described herein may be made without sacrificing these advantages, and such modifications fall within the scope of the appended claims.

I claim:—

1. In a dry cell, a conducting, depolarizing mix containing absorbed electrolyte solution, said mix comprising carbon, a depolarizing substance, and an inert absorptive material adapted to augment the liquid absorptive properties of the mix to the proper degree.

2. In a dry cell, a depolarizer comprising manganese dioxid and carbon, and an absorptive material associated with said depolarizer and adapted to increase the liquid retaining properties thereof.

3. In a dry cell, a depolarizer comprising manganese dioxid and carbon, and an inert absorptive material associated with said depolarizer and adapted to increase the liquid retaining properties thereof.

4. In a dry cell, a conducting, depolarizing mix containing absorbed electrolyte solution, said mix comprising carbon, manganese dioxid, and comminuted non-conducting, non-oxidizing, absorptive material.

5. In a dry cell, a depolarizer comprising manganese dioxid and carbon, and an absorptive material associated with said depolarizer in amount not exceeding the weight of the carbon constituent.

6. In a dry cell, a depolarizing composition comprising manganese dioxid, carbon and a material characterized by high absorptive capacity for liquids, such material being present in amount of about 30% of the weight of the carbon.

In testimony whereof, I affix my signature.

EDWARD C. SMITH.